(12) United States Patent
Land

(10) Patent No.: US 6,964,514 B2
(45) Date of Patent: Nov. 15, 2005

(54) TEMPERATURE MEASURING APPARATUS

(75) Inventor: David Victor Land, Glasgow (GB)

(73) Assignee: The University Court of the University of Glasgow, Glasgow (GB)

(*) Notice: Subject to any disclaimer, the term of this patent is extended or adjusted under 35 U.S.C. 154(b) by 0 days.

(21) Appl. No.: 10/236,372

(22) Filed: Sep. 6, 2002

(65) Prior Publication Data

US 2003/0026321 A1 Feb. 6, 2003

Related U.S. Application Data

(63) Continuation of application No. PCT/GB01/01043, filed on Mar. 9, 2001.

(30) Foreign Application Priority Data

Mar. 10, 2000 (GB) ............................................. 0005926

(51) Int. Cl.⁷ .................................................. G01J 5/00
(52) U.S. Cl. ........................................ 374/122; 374/129
(58) Field of Search ................................. 374/121, 122, 374/127, 129, 128, 130, 120; 702/134

(56) References Cited

U.S. PATENT DOCUMENTS

| | | | | |
|---|---|---|---|---|
| 3,466,654 A | * | 9/1969 | Abronson | 374/122 |
| 3,586,970 A | | 6/1971 | Conway | 324/58.5 |
| 3,777,270 A | * | 12/1973 | Hardy et al. | 374/122 |
| 3,978,797 A | * | 9/1976 | Harrington et al. | 102/214 |
| 4,081,679 A | * | 3/1978 | Cohn | 250/338.1 |
| 4,106,340 A | * | 8/1978 | Hamid | 374/101 |
| 4,235,107 A | * | 11/1980 | Ludeke et al. | 374/122 |
| 4,568,200 A | * | 2/1986 | Hatono et al. | 374/122 |
| 4,583,869 A | * | 4/1986 | Chive et al. | 374/122 |
| 4,872,014 A | * | 10/1989 | Nowogrodzki | 342/351 |
| 4,884,896 A | * | 12/1989 | Conway | 374/9 |
| 5,014,010 A | * | 5/1991 | Helms et al. | 324/640 |
| 5,149,198 A | * | 9/1992 | Sterzer | 374/122 |
| 5,176,146 A | * | 1/1993 | Chive et al. | 600/549 |
| 5,209,355 A | * | 5/1993 | Mindermann | 209/3.1 |
| 5,688,050 A | * | 11/1997 | Sterzer et al. | 374/122 |
| 5,741,071 A | | 4/1998 | Weiss et al. | 374/175 |
| 5,909,963 A | | 6/1999 | Weiss et al. | 374/175 |
| 6,000,844 A | * | 12/1999 | Cramer et al. | 374/5 |
| 6,137,440 A | * | 10/2000 | Roeder et al. | 342/351 |
| 6,834,991 B2 | * | 12/2004 | Roeder | 374/122 |

FOREIGN PATENT DOCUMENTS

| | | | | |
|---|---|---|---|---|
| EP | 0 294 854 A2 | 12/1988 | | |
| EP | 0 697 600 A1 | 2/1996 | | |
| FR | 2 650 390 | 7/1989 | | |
| GB | 2013350 A | 8/1979 | | |
| JP | 55101830 A | * 8/1980 | | G01J/5/00 |
| JP | 63124926 A | * 5/1988 | | G01J/5/50 |
| JP | 01244321 A | * 9/1989 | | G01J/5/50 |
| JP | 03162637 A | * 7/1991 | | G01J/5/50 |

OTHER PUBLICATIONS

J.P. Sozanski et al., "Microwaves In Medicine 1993", 2nd International Scientific Meeting, University of Rome, p. 225–228 (1993).

* cited by examiner

*Primary Examiner*—Gail Verbitsky
*Assistant Examiner*—Mirellys Jagan
(74) *Attorney, Agent, or Firm*—Winston & Strawn LLP

(57) ABSTRACT

An improved apparatus for measuring the temperature of an object such as a food object. Also, a related method, container, transportation member and production line which utilizes this apparatus. The apparatus includes a coupling device for coupling radiation emanating from the object to at least a first radiation temperature measuring radiometer, and a first device for switching measurement circuitry between measuring the radiation temperature of at least a first reference temperature and the radiation temperature of the object.

56 Claims, 6 Drawing Sheets

TEMPERATURE MEASURING APPARATUS

CROSS-REFERENCE TO RELATED APPLICATION

The present application is a continuation of the US national stage designation of International Application PCT/GB01/01043 filed Mar. 9, 2001, the content of which is expressly incorporated herein by reference thereto.

FIELD OF INVENTION

This invention relates to a temperature measuring apparatus. The invention in particular, though not exclusively, relates to the use of microwave radiometry in the measurement of temperature. In particular further, though not exclusively, the present invention relates to use of microwave radiometry in monitoring temperature of a sample, such as a food product during processing, e.g., production, cooking, packaging, storing, freezing, defrosting, or the like.

BACKGROUND OF INVENTION

The food industry in particular, requires a non-invasive, non-destructive temperature measuring technique for process monitoring, product safety and quality control. Typical requirements are to check that a food product has been cooked, or at least partly cooked, to a specified minimum temperature, or cooled to below a specified temperature, e.g., for storage or distribution. At present, the only useful technique is invasive probing by thermocouple or thermistor temperature sensors. The product so tested must be discarded after probing. Such a technique is therefore necessarily a sampling technique where the chosen samples are wasted. The temperature measured by probing therefore also only applies to a small volume of material around the probe, and the probing is subject to significant operator-dependent variability.

The present invention seeks to employ microwave radiometric temperature measurements which are inherently non-invasive and non-destructive. This allows potentially a whole production batch to be monitored, with no financial penalty, which can improve the efficiency of the process and the quality and safety control of the product.

It is desired that the microwave temperature measurement be made in a way that is independent of an operator, not be influenced by electromagnetic radiation external to the product being measured, and be dependent on the temperature within or throughout the bulk of the product material. Electromagnetically enclosed cavities/cavity-antennas provide a way of coupling the microwave thermal radiation from a product to the radiation temperature measuring radiometer receiver that meets these requirements. The radiometric temperature of the signal from the cavity/cavity antenna must be measured by a microwave radiometer capable of measuring the temperature over the range required for the application, with an accuracy, resolution and response time appropriate to the application.

It is also desired to employ microwave radiometry requiring:

(a) Good microwave temperature measurement accuracy over an increasingly wide temperature range (comparable to good electrical thermometry), e.g., +/−0.5° C. from −20° C. to 100° C. for food product.

(b) High microwave temperature measurement accuracy over the bio-medical temperature range (e.g., +/−0.1° C. from 30° C. to 43° C.).

(c) An ability to determine the proper matched-impedance radiometric temperature of a source connected to the radiometer in the presence of impedance mis-match reflections between the source and the radiometer.

(d) An ability to make a determination of the proper matched-impedance radiometric temperature of a source connected to the radiometer with a uniform frequency response over the measurement bandwidth. This is highly desirable for measuring sources that may have a non-uniform radiation spectrum within the measurement bandwidth.

In one aspect the radiometer design requires to determine the source temperature independently of the gain of the microwave amplification, detection, and post-detection amplification. Strictly this may be the gain between a radiometer input ("Dicke") switch and the post-detection synchronous demodulation. Implicitly the gain dependence contains frequency response independence (just gain at a given frequency). Gain stability and frequency response uniformity are, however, required between the input ("Dicke") switch and the two reference sources. These are, however, passive microwave circuit paths and these requirements can be provided by practical microwave components.

It may also be desired to provide the following requirements:

(e) A need to measure radiometric temperatures at different frequencies to estimate temperature profiles within source materials.

(f) A need for radiometric temperatures measured at different frequencies to be accurately related to each other (application dependent but to less than 0.1° C. for medical applications and to less than 0.5° C. for industrial applications).

It is an object of at least one aspect of the present invention to obviate or at least mitigate one or more of the aforementioned problems.

It is a further object of at least one aspect of the present invention to seek to provide one or more of the aforementioned requirements.

The above-mentioned measurements need to be made with the best response-time temperature resolution that microwave radiometry is inherently capable of (i.e., The "Gabon limit"). For industrial applications the measuring radiometer must also operate in a wide range of ambient temperatures (e.g. from about −10° C. to about 40° C. without significant degradation of measurement accuracy). Further, the radiometer should not require frequent calibration.

SUMMARY OF INVENTION

According to a first aspect of the present invention there is provided an apparatus for measuring a temperature of an object comprising:

means for coupling radiation emanating from the object to at least a first radiation temperature measuring radiometer; and first means for switching measurement circuitry between measuring a radiation temperature of at least a first reference temperature source and a radiation temperature of the object.

Preferably, there are provided means for establishing a standing wave pattern of the radiation from the object. In this way the apparatus may be used to efficiently collect and couple (natural) thermal radiation emanating from the object being measured.

Preferably, the radiation is in the microwave region. Preferably, the microwave radiation has a frequency in the range of 0.1 GHz to 30 GHz.

Preferably, there are provided means for coupling the radiation to a second radiometer.

Preferably, there are provided second means for switching measurement circuitry between the temperature signal of at least a second reference temperature source and the temperature of the object.

Preferably, there are provided first and second switching means which operate out of phase with one another. Preferably, signals from the first and second switching means are demodulated at a switching frequency of the first switching means. This may be used as a means of computing/finding a ratio of the in-phase to quadrature rate signals. This may be obtained by using, for example, analogue electronic "synchronous detector" circuits, or by numerical (digital) signal processing after analogue to digital signal conversion.

According to a second aspect of the present invention there is provided a method for measuring a temperature of an object comprising:

coupling radiation emanating from the object to at least a first measuring radiometer;
switching measurement circuitry between a signal representative of temperature of at least a first reference temperature source and a signal representative of temperature of the object.

Preferably, the method also comprises a preceding step of establishing a standing wave pattern of radiation emanating from the object.

In this way the method may be used to efficiently collect and couple (natural) thermal radiation from the object being measured to the measurement circuitry.

According to a third aspect of the present inventions, there is provided a container such as a transportation container, including an apparatus for measuring a temperature of an object according to the first aspect.

According to a fourth aspect of the present invention, there is provided a transportation means including an apparatus for measuring a temperature of an object according to the first aspect.

According to a fifth aspect of the present invention there is provided an apparatus for measuring a temperature of an object comprising:
means for coupling radiation emanating from the object to at least a first radiometer;
first means for switching measurement circuitry sequentially between signals representative of temperatures of at least two different reference temperature sources and a signal representative of a temperature of the object; and
means for splitting a signal from the switching means between at least two frequency selective channels.

In this way the apparatus may be used to efficiently collect and couple (natural) thermal radiation emanating from the object being measured. Furthermore, in this way, one may provide one or more frequency dependent radiometric temperatures and via demodulation a ratio for each channel. Preferably, there are provided means for establishing a standing wave pattern of the radiation from the object. Preferably, the radiation is in the microwave region. Preferably, the microwave radiation has a frequency in the range of 0.1 GHz to 30 GHz.

Preferably, there are provided demodulation means for demodulating the switched signals after amplification and detection and computing the ratio of in-phase and phase-quadrature components relative to the sequential switching by synchronous demodulation at a frequency of operation of the first switching means.

According to a sixth aspect of the present invention there is provided a method of measuring a temperature of an object comprising:

coupling radiation emanating from an object to at least a first radiometer;
switching measurement circuitry sequentially between signals representative of temperatures of at least two different reference temperature sources and a signal representative of the temperature of the object; and
splitting a signal from the switching means between at least two frequency selective channels.

In this way, the method may be used to efficiently collect and couple (natural) thermal radiation from the object being measured. Furthermore, in this way one may provide one or more frequency dependent radiometric temperatures and via demodulation a ratio for each channel.

Preferably, the method also comprises the initial step of establishing a standing wave pattern of radiation emanating from the object.

According to a seventh aspect of the present invention, there is provided a container such as a transportation container including an apparatus for measuring a temperature of an object according to the fifth invention.

According to an eighth aspect of the present invention, there is provided a transportation means including an apparatus for measuring a temperature of an object according to the fifth aspect.

According to a ninth aspect of the present invention there is provided an apparatus for measuring a temperature of an object comprising:

means for coupling radiation emanating from the object to at least two radiometers each having at least one reference temperature signal source; and
means for controlling the radiometers such that when one radiometer is detecting the radiation another one of the radiometers is detecting the at least one reference temperature signal source the said one radiometer is detecting the at least one reference temperature signal source the said another one of the radiometers is detecting the radiation.

At least two measurements are therefore available in the same time as one measurement would be for an apparatus having only one radiometer. This may be beneficial in increasing a throughput of objects to be temperature measured, e.g., in a high volume production line or the like.

The apparatus may also enable efficient collection and coupling of (natural) thermal radiation emanating from the object being measured.

Preferably, the thermal radiation emanating from the object is used to set up a standing wave pattern.

Preferably, the radiation is in the microwave region. Preferably, the microwave radiation has a frequency in the range of 0.1 GHz to 30 GHz.

Preferably, the radiometers are Dicke or comparator type radiometers.

The reference temperature signal source of each radiometer may have the same source or may have different sources.

Preferably, each of the one and another radiometers have the same switching frequency between the radiation and the reference temperature signal source.

Preferably, the one and the another radiometers are 180° out of phase with one another, in operation.

According to a tenth aspect of the present invention there is provided a method for measuring a temperature of an object comprising:

coupling radiation emanating from an object to at least two radiometers each having at least one reference temperature signal source; and
controlling the radiometers such that when one radiometer is detecting the radiation another one of the radiometers is detecting the at least one reference temperature signal and when the said one radiometer is detecting the at least one reference temperature source the said another one of the radiometers is detecting the radiation.

In this way, the apparatus may be used to efficiently collect and couple (natural) thermal radiation emanating from the object being measured.

According to an eleventh aspect of the present invention there is provided a container such as a transportation container including an apparatus for measuring a temperature of an object according to the ninth aspect.

According to a twelfth aspect of the present invention there is provided a transportation means including an apparatus for measuring a temperature of an object according to the ninth aspect.

According to a thirteenth aspect of the present invention there is provided a production line including an apparatus for measuring a temperature of an object according to the first, fifth or ninth aspects.

According to a fourteenth aspect of the present invention there is provided a radiometer device comprising at least two radiometers each having at least one reference temperature signal source and means for controlling the at least two radiometers such that when one radiometer is detecting radiation another one of the radiometers is detecting the at least one reference temperature signal and when the said one radiometer is detecting the at least one reference temperature source the said another one of the radiometers is detecting radiation.

BRIEF DESCRIPTION OF DRAWINGS

Embodiments of the present invention will now be described, by way of example only, and with reference to the accompanying drawings which are.

DETAILED DESCRIPTION OF PREFERRED EMBODIMENTS

Figure 1:
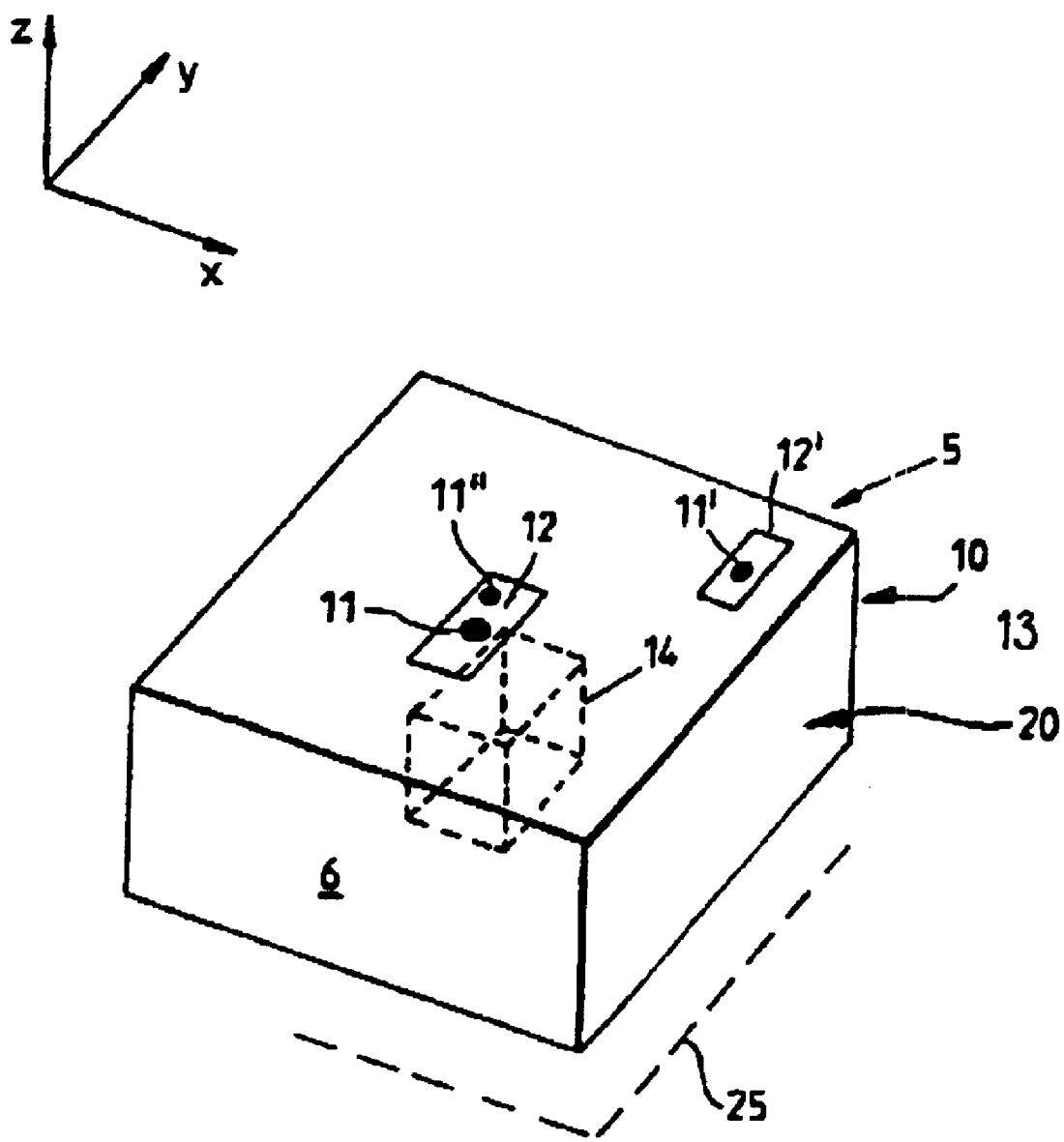
FIG. 1 is a schematic perspective view of an apparatus for measuring a temperature of an object given by way of illustration for use in a number of embodiments of the present invention, the illustrative apparatus including a cavity.

Referring initially to FIG. 1 an apparatus generally designated 5 according to a first embodiment of the present invention, for measuring a temperature of an object or product 14, such as a food product, comprises:

means for coupling radiation emanating from the object 14 to at least a first radiation temperature measuring radiometer 11; and first means for switching measurement circuiting between measuring a radiation temperature of at least a first reference temperature source and a radiation temperature of the object 14.

As can be seen from FIG. 1, the apparatus 5 includes a walled structure 6 defining a cavity 10 wherein the object 14 is received the cavity having a coupling port 12. The apparatus 5 represents a typical apparatus according to the present invention used to monitor the temperature of an object 14 using natural emanating microwave radiation from the object 14. The coupling port 12 electro-magnetically connects the cavity 10 to one or more radiation signal measuring radiometer receivers (forming an "antenna-cavity" structure).

The cavity 10 is made from a suitable conductive material such as copper, copper plated steel and silver plated brass. These materials are chosen because they have good microwave surface conductivity. The enclosing of the measurement region provides isolation from external sources of electro-magnetic radiation allowing proper measurement of the effective radiation temperature of an object 14 within the cavity 10. As can be seen from FIG. 1, the object 14 is substantially centrally placed within the casing 10.

A suitable size of cavity 10 is 0.25 m×0.25 m×0.15 m. However, a wide range of sizes from a few millimetres to a few metres can be used depending on the frequency and mode of measurement. It is, for example, in an embodiment of the present invention possible to monitor a temperature of an object 14 within the apparatus 5 which apparatus can comprise a transport container 20 on a transportation means 25 such as a lorry, or a train, or ship, or the like. Alternatively the apparatus 5 can comprise part of a production line 25.

In use, to measure the temperature of the object 14 a microwave standing wave pattern of naturally occurring microwaves from the object 14 is set-up inside the cavity 10. The microwaves are typically in the wavelength region 0.1 GHz to 30 GHz.

An apparent radiation temperature seen by a radiometer 11 connected to the cavity 10 will be substantially that of the material of the object 14 within the cavity 10 weighted according to a weighting function applying to the whole source (cavity and product). By weighting function is meant that although the temperatures across the whole cavity 10 contribute to the obtained measured temperature, the temperature reading is biased due to the standing wave arrangement in the cavity 10 towards a certain region of the cavity 10. Therefore, by altering the properties of the standing wave pattern different regions of the object 14 within different parts of the cavity 10 can have their temperature measured. In general, if the radiation losses of the object 14 are much larger than the losses in the enclosing/coupling antenna-cavity structure 10, the measured temperature will be close to that of the object 14 and the antenna-cavity temperature has only a small effect.

Figure 2:
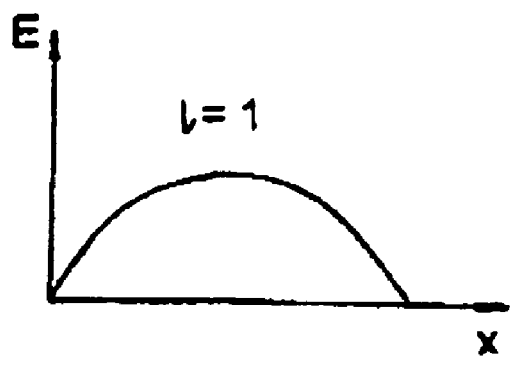
FIG. 2 is a graph of electric field and power for l=1, m=1 and n=0 (with l, m, n being integral numbers which define the form of the standing wave patterns in the 3 dimensions of the cavity of the apparatus of FIG. 1)
Figure 2:
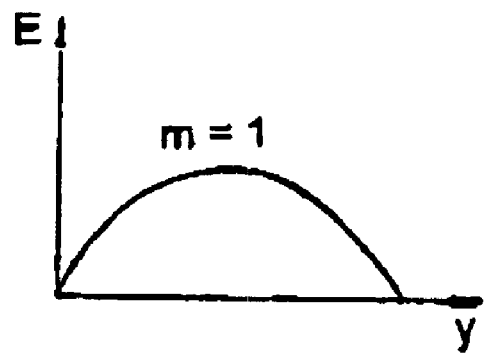
Figure 2:
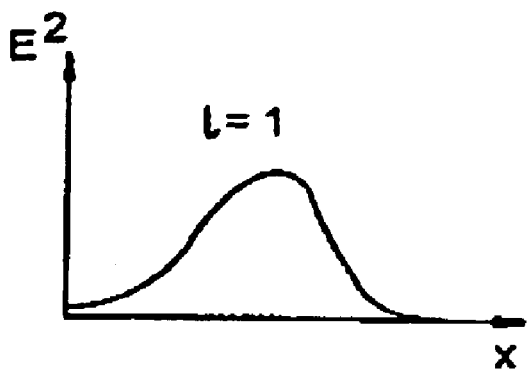
Figure 2:
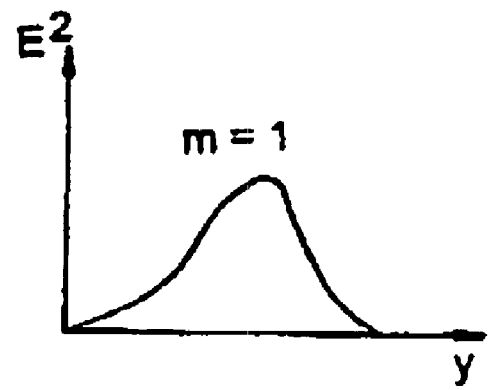
Figure 2:
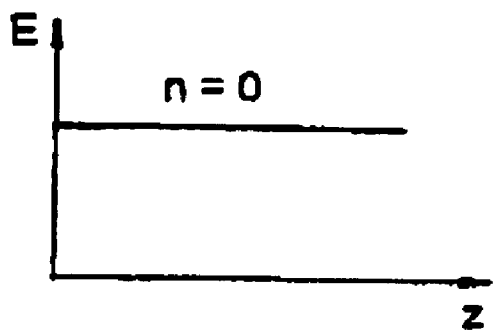

Referring to FIG. 2 there are shown field and power density profiles across the cavity 10 for a given frequency of radiation. It can be clearly seen that the signal is strongest in the centre of the cavity 10 and, therefore, the temperature reading will be predominantly biased by the temperature in that region. To measure the temperature of the object 14, the object 14 should therefore be placed in the centre of the measurement region. The arrangement in FIG. 2 therefore provides a centrally weighted microwave temperature measurement.

It should be noted that in FIG. 2 a uniform Z-field is used and there is therefore, no variation in the vertical direction.

(If the Z-field was varied a 3-D topographic surface would be obtained for the electric field and power density).

Figure 3:
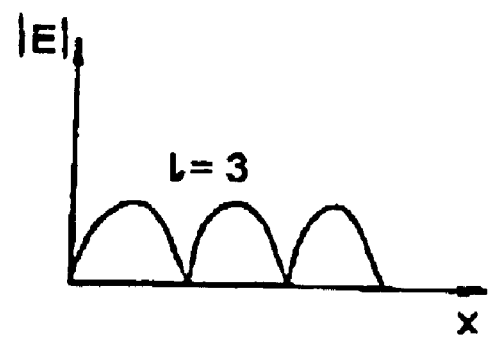
FIG. 3 is a graph of electric field and power for l=1, m=1, and n=1.
Figure 3:
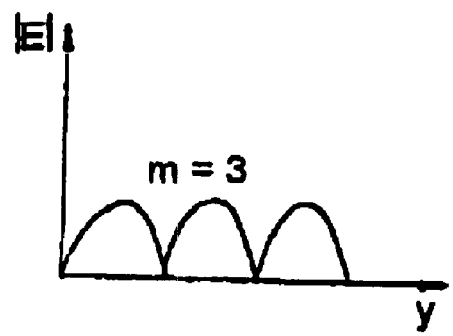
Figure 3:
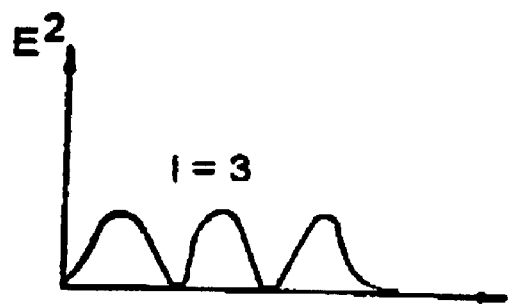
Figure 3:
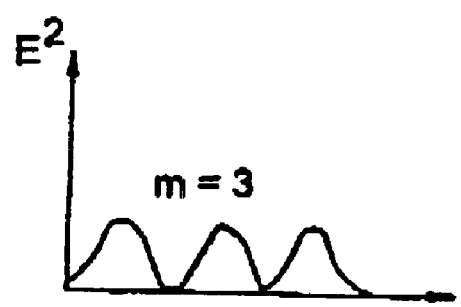
Figure 3:
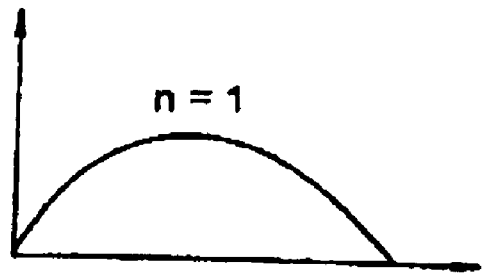

FIG. 3 shows electric field and power density profiles for a further given frequency of higher frequency than the given frequency of FIG. 2. In FIG. 3, the obtained temperature reading, therefore, tends towards a "quasi-uniform" response across the whole of the cavity 10 tending to give an "average" temperature for the object 14 within the cavity 10.

Figure 4:
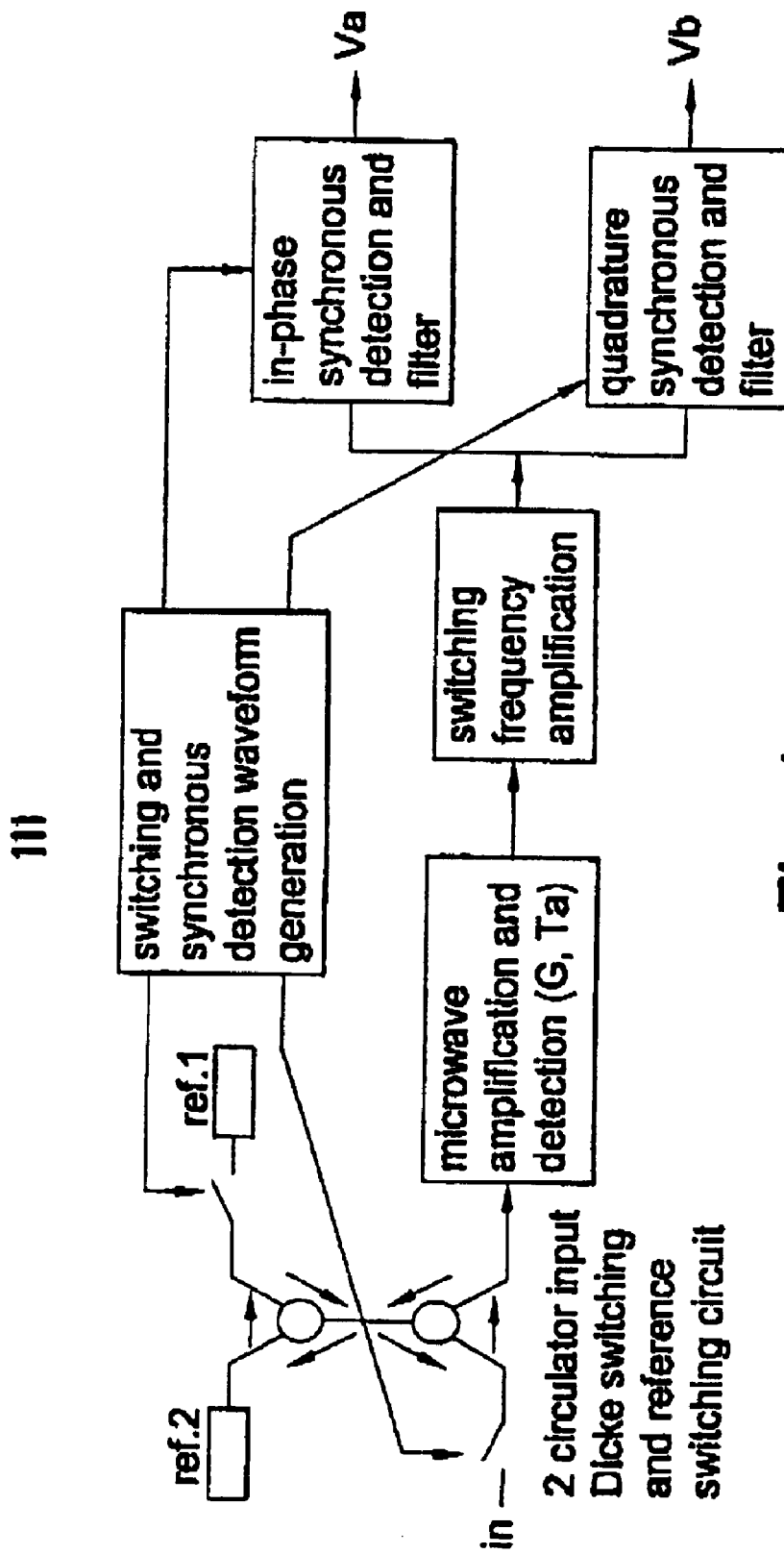
FIG. 4 is a schematic diagram of a single frequency two-reference radiometer capable of use with the apparatus of FIG. 1 in embodiments of the present invention.
Figure 5:
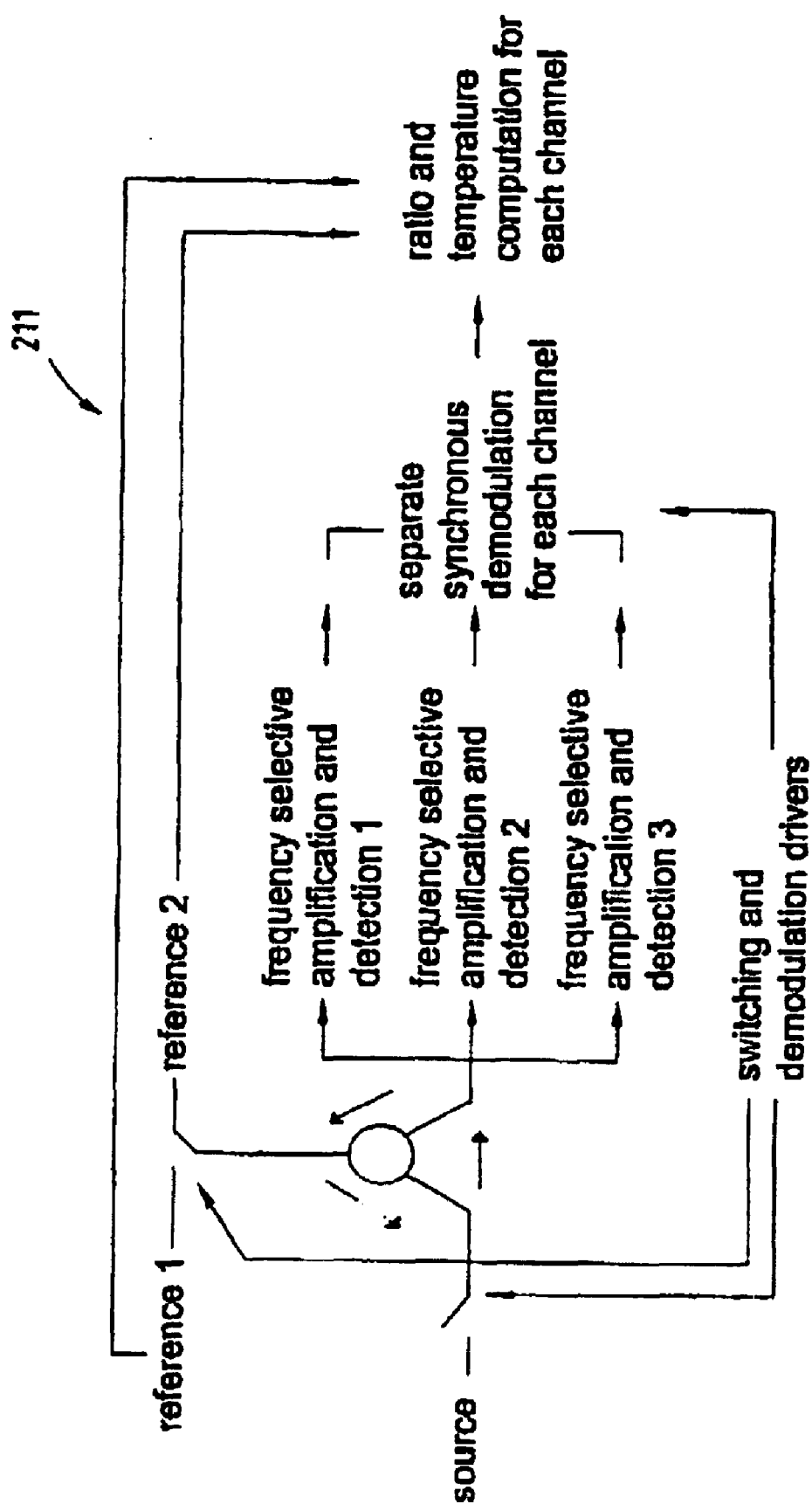
FIG. 5 is a schematic diagram of multi-frequency two-reference radiometer capable of use with the apparatus of FIG. 1 in further embodiments of the present invention.
Figure 6:
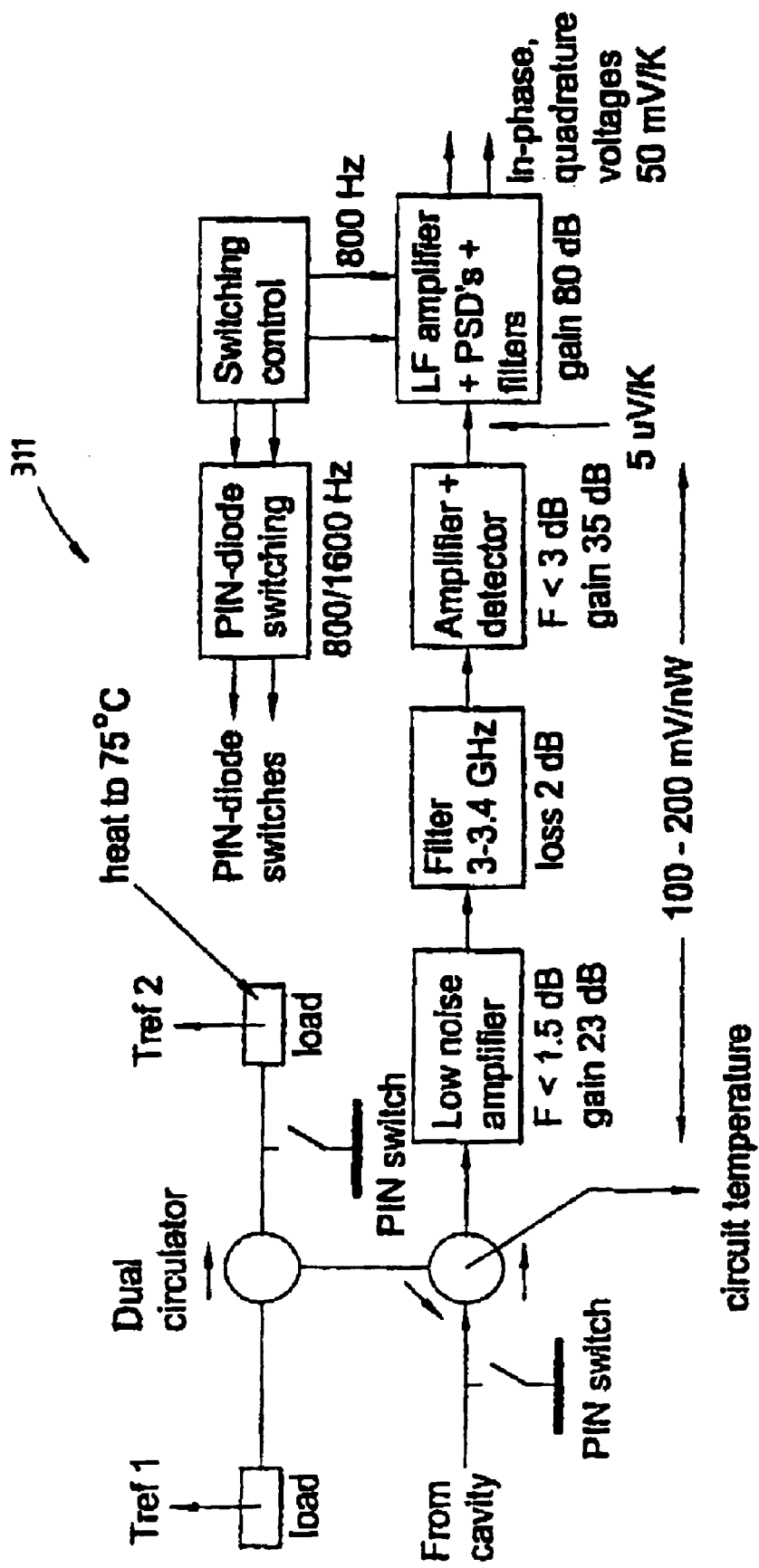
FIG. 6 is a schematic diagram of a radiometer capable of use with the apparatus of FIG. 1 in or still further embodiments of the present invention, the radiometer being adapted for analysis of a signal from the cavity.

Referring to FIGS. 4, 5 and 6, there are illustrated radiometers, generally designated 111, 211, 311 respectively, which may be used in this first embodiment of the present invention.

FIG. 4 illustrates a radiometer 111, having two reference temperature sources. The ratio Va/Vb gives the gain (G), amplifier noise temperature Ta, and input reflection coefficient independent "R" value used to calculate the source microwave radiometric temperature. The reference temperatures used with R for the calculation are obtained from direct, contact temperature measurements on the reference loads using the instrument calibration.

The microwave (or radio) frequency radiometer 111 uses a switch+circulator input circuit to switch between the object 14 to be measured and a reference temperature source which can be switched to, for example, two different values of reference temperature. At any point after the source reference switch but before high-frequency detection, the signal is switched between two or more frequency selective channels of amplification and detection. Each of the post-detection signals is then demodulated into in-phase and phase-quadrature components relative to the switching sequence by synchronous demodulation at the switching frequency. The ratio of each pair of in-phase to the phase-quadrature signals is taken along with non-high-frequency measurements and calibration information which gives reference temperature values, to compute an equivalent temperature of the source signal for each of selected frequency ranges. The value of each of the post-detection signal ratios is independent of any source to radiometer reflection and independent of amplification (gain and frequency response) between the source-reference switch and the synchronous demodulation. Each computed temperature is thus reflection independent and amplification gain independent. Each frequency dependent signal and computed source temperature is referenced to the same two temperature reference sources and the source and reference signals pass through the same radiometer input circuit components for all frequencies measured.

The use of a source-reference switching sequence is advantageous in that synchronous post-detection demodulation combined with the use of frequency selective amplification and detection allows simultaneous "real time" values of frequency dependent radiometric temperature for a source.

The use of two reference temperatures chosen to be above and below the main measurement temperature gives good temperature measurement accuracy. The use of the synchronous source-reference switching sequence and the post-detection signal demodulation combined with post-source-reference switching frequency selection allows continuous and simultaneous "real time" multifrequency temperature measurements with measurement times and temperature resolutions appropriate to a particular applications requirements. Each temperature value determined by the radiometer 111 is independent of any reflection between the source object 14 and the radiometer 111 and is independent of the ambient temperature sensitive amplification gain in the high-frequency parts of the radiometer 111. Since each frequency dependent signal and computed source temperature is referenced to the main two temperature reference sources, an excellent intercalibration accuracy is achieved.

FIG. 5 illustrates a radiometer 211 comprising a multi-frequency two-reference radiometer having two-reference temperature sources ref 1 and ref2. The radiometer 211 is a practical 3-band radiometer using microwave switches, circulator and reference loads operating over 2–4 GHz, feeding a low-noise 2–4 GHz microwave amplifier after the circulator. After the amplifier the signal is split into 3 channels of filters, amplifiers and detectors at, for example, 2.0–2.4 GHz, 2.8–3.2 GHz and 3.6–4.0 GHz. After post-detection demodulation computation the radiometer 211 provides the equivalent microwave temperatures of the object 14 centred on 2.2, 3.0 and 3.8 GHz.

FIG. 6 illustrates a radiometer 311 having two-reference temperature sources, Tref 1 and Tref 2. The radiometer 311 includes various component sections for analysis of a radiation temperature signal from cavity 10.

The radiometric signal from the source antenna-cavity goes first to a circuit comprising two electronic microwave switches ("PIN switch" for PIN-diode switch), two microwave circulators (the "dual circulator") and two microwave matched impedance loads (marked "load"). When the switches are closed (shorting to ground in the particular configuration shown) microwave signals are efficiently reflected from them. When they are open (for the configuration shown) microwave signals are efficiently transmitted past them. The circulators allow microwave signal transmission from port to port around the radiometer 311 in a specified direction or order (e.g. port 1 to 2 to 3 to 1; not 3 to 2 to 1 to 3). The matched impedance microwave loads are fitted with temperature measuring sensors which, following calibration, allows them to provide accurately known thermal (i.e., radiometric) signals to the microwave circuits to which they are connected. The switches are operated sequentially to provide source-reference signals needed for the operation of the radiometer 311, (e.g. the source switch is open and shut for accurately equal lengths of time over one switching cycle, e.g., 1 millisecond, and within each open or closed half of the cycle the reference switched with accurately equal open and shut times—0.25 milliseconds for this case). This circuit then provides a timed sequence of four radiometric temperatures of essentially the form: source+reference 1+circuit noise; source+reference 2+circuit noise; reference 1+circuit noise; reference 2+circuit noise. The temperature of the microwave switching circuit components may be monitored to calculate the effective radiometric reference temperatures with improved accuracy.

The sequence of radiometric temperature signals from the switching circuit is amplified, filtered to define the frequency range for measurement, and high-frequency detected to provide a signal at the switching frequency and its harmonics (at 1 kHz and low order harmonics for this case). This signal is amplified and passed to in-phase and quadrature phase-sensitive or synchronous demodulators to extract the in-phase and quadrature components which are then passed through low-frequency low pass filters. The resulting voltages are passed to analogue to digital converters and a computing system, which calculates the radiometric temperature of the source signal from the ratio of these voltages and the measured temperatures of the reference loads and calibration information. The remaining circuitry generates accurately time switched waveforms for the microwave switches and the synchronous demodulators.

Referring again to FIG. 1 an apparatus, generally designated 5 according to a second embodiment of the present invention, for measuring a temperature of an object or product 14, such as a food product, comprises:

means for coupling radiation emanating from the object 14 to at least a first radiometer;

first means for switching measurement circuitry sequentially between signals representative of temperatures of at least two different reference temperature sources and a signal representative of the temperature of the object 14; and means for splitting a signal from the switching means between at least two frequency selective channels. In this way one may provide one or more frequency dependent radiometric temperatures and via demodulation, a ratio for each channel. The results obtained are therefore independent of the radiometer used to perform the measurements.

The microwave (or radio) frequency radiometer 11 uses a switch+circulator input circuit to switch between the source to be measured and a reference temperature source which can be switched to two different values of reference temperature. The source-reference switching sequence is such that after high-frequency amplification and detection, the post-detection signal can be resolved into in-phase and phase-quadrature components relative to the switching sequence by synchronous demodulation (i.e. detection) at this switching frequency. The ratio of the in-phase to phase-quadrature signals taken along with non-high-frequency measurements and/or calibration information to obtain the reference temperature values, allows the equivalent matched-impedance noise temperature of the source signal to be computed. The value of the post-detection signal component ratio is independent of any source to radiometer impedance mis-match reflection. This ratio is also independent of signal amplification (gain and frequency response) between the source-reference switch and the synchronous demodulation. The computed temperature is thus reflection independent and amplification gain independent.

The use of a source-reference switching sequence is advantageous in that the source/reference switching sequence (pattern) combined with in-phase and quadrature demodulation at the switching frequency provides two signals whose ratio is reflection and gain independent. The signal is computed from the post synchronous demodulation signals.

The use of two reference temperatures chosen to be above and below the main measurement range gives good temperature measurement accuracy. The use of the synchronous source-reference switching sequence and the post-detection signal demodulation allows continuous "real time" temperature measurement with measurement times and temperature resolutions appropriate to that of a specific application's requirement. The temperature value determined by the radiometer 11 is independent of any reflection between the source and the radiometer 11. The temperature value determined by the radiometer 11 is independent of the ambient temperature sensitive amplification gain in the high-frequency part of the radiometer 11.

Referring to FIGS. 4, 5, and 6, there are illustrated radiometers, generally designated 111, 211, 311 respectively, which have hereinbefore been described and which may be used in this second embodiment of the present invention.

In the radiometer 111 of FIG. 4, the ratio of the in-phase synchronous detection and the quadrature synchronous detection is used to calculate the source microwave radiometric temperature.

Referring yet again to FIG. 1 an apparatus, generally designated 5 according to a third embodiment of the present invention, for measuring a temperature of an object or product 14, such as a food product, comprises:

means for connecting or coupling to (natural) thermal radiation from the object 14 being measured; means for coupling the radiation to at least two radiometers 11,11',11", each having at least one reference temperature signal source; and means for controlling the radiometers 11,11',11" such that when one radiometer 11 is measuring the object radiation temperature signal another one of the radiometers 11',11" is measuring the at least one reference temperature signal source and when the said one radiometer 11 is measuring the reference temperature signal source the said another one of the radiometers 11',11" is measuring the object radiation temperature signal.

The radiometers 11,11',11" may comprise two Dicke or comparator type radiometers which are to some degree electro-magnetically coupled to through use of a common antenna cavity structure. The radiometers 11,11',11" may use a common coupling port 12 or separate coupling ports 12,12', probe or loop structures. The radiometers 11, 11', 11" may be any form of Dicke radiometers using one or two reference temperature sources, but the source-reference switching advantageously have the same frequency and equal source and reference connection times (1:1 source:reference ratio). If the source switching of the radiometer 11, 11',11" is in synchronism in-phase, both radiometers 11,11', 11" will be coupled to the source region simultaneously. This overcomes the problem where if the two radiometers 11,11' or 11,11" are not switched synchronously wherein there will be times when both radiometers 11,11' or 11,11" are simultaneously coupled to the source region. (At the difference ("beat") frequency between the two frequencies). In this situation each radiometer 11,11',11" will, at these times, tend to couple through the common source region to the noise signal from the input circuit of the other radiometer. Each radiometer 11,11',11" will then measure a radiometric temperature that is a combination of the wanted source temperature and the noise temperature of the other radiometer input circuit. The error due to the input circuit noise coupling will, in general, be ill-controlled and be particularly dependent on source material to coupling structure interactions. If the radiometer to source region couplings are designed to couple at different frequencies or to different source region field patterns (standing wave modes/radiometric weighting functions), this will provide some reduction in the radiometer cross-coupling but will not, in practice, eliminate it. The present embodiment involves synchronised radiometer switching cycles with a half-cycle (180° phase) difference, when a radiometer 11 will be coupled to the measurement region when the other radiometer 11' or 11" is switched to its reference source. Except for the insertion losses of the radiometer input switches when in their referenced positions, this synchronised switching arrangement will provide full isolation between the radiometers 11, 11' or 11,11". This will allow simultaneous rather than sequential measurements to be made by the two radiometers 11,11' or 11,11", with total temperature measurement time that of an individual radiometer.

It will be appreciated that the embodiments of the present invention hereinbefore described are given by way of example only, and are not meant to limit the scope of the invention in any way.

It will be particularly appreciated that this invention and particularly the third embodiment hereinbefore described has advantages in that the temperature of an object (sample) may be measured relatively quickly. The apparatus of the invention and particularly the third embodiment is, therefore, highly suitable for a high volume production line.

What is claimed is:

1. An apparatus for measuring a temperature of at least a portion of an object comprising:
    means for coupling radiation emanating from the object to at least a first radiation temperature measuring radiometer receiver;
    measurement circuitry; and
    first and second means for switching the measurement circuitry between measuring a radiation temperature of at least a first reference temperature source, a second reference temperature source and a radiation temperature of the object as received by said first radiation temperature measuring radiometer receiver,
    wherein the measurement circuitry includes two synchronous detectors which operate in phase quadrature with each other to form radiometric temperature signals at a Dicke switching frequency in the absence of low frequency filtering or integration components, and utilizes a synchronous source-reference switching sequence and a post-detection signal demodulation process to provide continuous and substantially simultaneous object temperature measurements from the radiometric temperature signals.

2. An apparatus according to claim 1, including means for collecting and coupling naturally occurring thermal radiation emanating from the object being measured to the measurement circuitry.

3. An apparatus according to claim 1, wherein there are provided means for establishing a standing wave pattern of the radiation from the object.

4. An apparatus according to claim 1, wherein there are provided means for coupling the radiation to a second radiometer.

5. An apparatus according to claim 1, wherein first and second reference temperatures are utilized that are chosen to be above and below a main measurement temperature.

6. An apparatus according, to claim 1, wherein the radiation is in the microwave region.

7. An apparatus according to claim 6, wherein the microwave radiation has a frequency in the range of 0.1 GHz to 30 GHz.

8. An apparatus according to claim 1, wherein the measurement circuitry completes a switching cycle sufficiently quickly for the object temperature measurements to be obtained in real time.

9. An apparatus according to claim 8, wherein the real time duration is on the order of about 1 millisecond.

10. An apparatus according to claim 1 wherein the first and second switching means operate out of phase with one another.

11. An apparatus according to claim 10, wherein the first switching means is switched at a predetermined frequency and the signals connected to the measuring circuitry by the first and second switching means are demodulated by the synchronous detectors at a switching frequency of the first switching means which frequency is also used as a means of determining a ratio of in-phase to quadrature signals.

12. An apparatus according to claim 11, wherein the means of determining includes or comprises analogue electronic synchronous detector circuitry, or analogue to digital conversion means and numerical (digital) signal processing means.

13. An apparatus according to claim 1, which further comprises:
    means for splitting a signal from the switching means between at least two frequency selective channels.

14. An apparatus according to claim 13, which include means for collecting and coupling naturally occurring thermal radiation emanating from the object being measured to the measurement circuitry.

15. An apparatus according to claim 13, which provides one or more frequency dependent radiometer temperature measurements and via demodulation a ratio for each channel.

16. An apparatus according to claim 13, wherein there are provided means for establishing a standing wave pattern of the radiation from the object.

17. An apparatus according to claim 13, wherein the synchronous detectors comprise demodulation means for demodulating the switched signals after amplification and detection and computing the ratio of in-phase and phase-quadrature components relative to the sequential switching by synchronous demodulation at a frequency of operation of the switching means.

18. An apparatus according to claim 13, wherein the radiation is in the microwave region.

19. An apparatus according to claim 18, wherein the microwave radiation has a frequency in the range of 0.1 GHz to 30 GHz.

20. A container including an apparatus for measuring a temperature of at least a portion of an object as claimed in claim 13.

21. A transportation means including an apparatus for measuring a temperature of at least a portion of an object as claimed in claim 13.

22. A production line including an apparatus for measuring a temperature of at least a portion of an object as claimed in claim 13.

23. An apparatus according to claim 1, wherein there are provided at least two radiation temperature measuring radiometers receivers each having at least on reference temperature signal source; and means for controlling the receivers such that when one of the receivers is detecting the radiation another one of the receivers is detecting the at least one reference temperature signal source and when the said one of the receivers is detecting the at least one reference temperature signal source the said another one of the receivers is detecting the radiation.

24. An apparatus according to claim 23 which includes means for allowing throughput of objects to be measured.

25. An apparatus according to claim 23 which includes means for enabling collection and coupling of naturally occurring thermal radiation emanating from the object being measured.

26. An apparatus according to claim 23, wherein the radiometers are Dicke or comparator radiometers.

27. An apparatus according to claim 23, wherein the reference temperature signal source of each of the receivers is the same source.

28. An apparatus according to claim 23, wherein the reference temperature signal source of each receiver has a different source.

29. An apparatus according to claim 23, wherein each of the one and another receivers have the same switching frequency between the radiation and the reference temperature signal source.

30. An apparatus according to claim 23, wherein the one and the another receivers are substantially 180° out of phase with one another, in operation.

31. An apparatus according to claim 23, wherein, in use, thermal radiation emanating from the object is used to set up a standing wave pattern.

32. An apparatus according to claim 31, wherein the radiation is in the microwave region.

33. An apparatus according to claim 32, wherein the microwave radiation has a frequency in the range of 0.1 GHz to 30 GHz.

34. A container including an apparatus for measuring a temperature of at least a portion of an object as claimed in claim 23.

35. A transportation means including an apparatus for measuring a temperature of at least a portion of an object as claimed in claimed 23.

36. A production line including an apparatus for measuring a temperature of at least a portion of an object as claimed in claim 23.

37. A container including an apparatus for measuring a temperature of at least a portion of an object as claimed in claim 1.

38. A transportation means including an apparatus for measuring a temperature of at least a portion of an object as claimed in claim 1.

39. A production line including an apparatus for measuring a temperature of at least a portion of an object as claimed in claim 1.

40. A method for measuring a temperature of at least a portion of an object comprising:

coupling radiation emanating from the object to at least a first measuring radiometer;

switching measurement circuitry between a signal representative of a temperature of a first reference temperature source, a signal representative of a temperature of a second reference temperature source, and a signal representative of a temperature of the object to form radiometric temperature signals at a Dicke switching frequency in the absence of low frequency filtering and integrating, and using a synchronous source-reference switching sequence and a post-detection signal demodulation process to provide continuous and substantially simultaneous object temperature measurements.

41. A method according to claim 40, which includes collecting and coupling naturally occurring thermal radiation from the object being measured by the measurement circuitry.

42. A method according to claim 40, which also comprises, preceding coupling radiation from the object to the at least first measuring radiometer, establishing a standing wave pattern of radiation emanating from the object.

43. A method according to claim 40, which further comprises selecting first and second reference temperatures to be above and below a main measurement temperature.

44. A method according to claim 40, comprising:

coupling radiation emanating from the object to at least first and second measuring radiometers receivers each having at least one reference temperature signal source; and controlling the receivers such that when one of the receivers is detecting the radiation another one of the receivers is detecting the reference temperature signal source and when the said one of the receivers is detecting the reference temperature signal source the said another one of the receivers is detecting the radiation.

45. A method according to claim 44, which includes collecting and coupling naturally occurring thermal radiation emanating from the object being measured.

46. A method according to claim 40, which further comprises switching the measurement circuitry to complete a switching cycle sufficiently quickly for the object temperature measurements to be obtained in real time.

47. A method according to claim 46, wherein the real time duration is on the order of about 1 millisecond.

48. A method according to claim 40, further comprising:

splitting a signal from the switching means between at least two frequency selective channels.

49. A method according to claim 48 which includes collecting and coupling naturally occurring thermal radiation from the object being measured.

50. A method according to claim 48, includes providing one or more frequency dependent radiometric temperature measurements and via demodulation a ratio for each channel.

51. A method according to claim 48, which comprises, preceding coupling radiation from the object to the at least first measuring radiometer, establishing a standing wave pattern of radiation emanating from the object.

52. A method for measuring a temperature of at least a portion of an object as claimed in claim 40, wherein the method is carried out in a production line.

53. An apparatus for measuring a temperature of at least a portion of an object comprising:

means for coupling radiation emanating from the object to a first radiation temperature measuring radiometer receiver;

measurement circuitry comprising two synchronous detectors which operate in phase quadrature with each other;

first and second means for switching the measurement circuitry between measuring a radiation temperature of at least a first reference temperature source, a second reference temperature source and a radiation temperature of the object as received by said first radiation temperature measuring radiometer receiver, wherein the first and second switching means operate out of phase with one another, and the signals from the first and second switching means are demodulated by the synchronous detectors at a switching frequency of the first switching means which is used as a means of determining a ratio of in-phase to quadrature signals to form radiometric temperature signals at a Dicke switching frequency in the absence of low frequency filtering or integration components, and utilizes a synchronous source-reference switching sequence and a post-detection signal demodulation process to provide continuous and substantially simultaneous object temperature measurements from the radiometric temperature signals.

54. An apparatus according to claim 53, wherein first and second reference temperatures are utilized that are chosen to be above and below a main measurement temperature.

55. An apparatus according to claim 53, wherein the measurement circuitry completes a switching cycle sufficiently quickly for the object temperature measurements to be obtained in real time.

56. An apparatus according to claim 55, wherein the real time duration is on the order of at least about 1 millisecond.

* * * * *

UNITED STATES PATENT AND TRADEMARK OFFICE
CERTIFICATE OF CORRECTION

PATENT NO. : 6,964,514 B2
DATED : November 15, 2005
INVENTOR(S) : Land

It is certified that error appears in the above-identified patent and that said Letters Patent is hereby corrected as shown below:

Column 12,
Lines 33-34, after "provided at least two radiation temperature measuring" change "radiometers" to -- radiometer --; and after "receivers each having at least", change "on" to -- one --.

Column 13,
Line 51, after "first and second measuring", change "radiometers" to radiometer --.

Column 14,
Line 13, after "A method according to claim 48," insert -- which --.

Signed and Sealed this

Twenty-fourth Day of January, 2006

JON W. DUDAS
*Director of the United States Patent and Trademark Office*